United States Patent
Backman

[19]

[11] Patent Number: 6,038,828
[45] Date of Patent: Mar. 21, 2000

[54] WALL MODULE SYSTEM

[75] Inventor: Bo Backman, Skellefteå, Sweden

[73] Assignee: Alimak AB, Skelleftea, Sweden

[21] Appl. No.: 09/077,197

[22] PCT Filed: Dec. 3, 1996

[86] PCT No.: PCT/SE96/01591

§ 371 Date: May 26, 1998

§ 102(e) Date: May 26, 1998

[87] PCT Pub. No.: WO97/21008

PCT Pub. Date: Jun. 12, 1997

[30] Foreign Application Priority Data

Dec. 4, 1995 [SE] Sweden .................................. 9504350

[51] Int. Cl.[7] .................................................. E04B 2/00
[52] U.S. Cl. ........................ 52/588.1; 52/591.4; 52/592.1
[58] Field of Search ................................ 52/588.1, 592.1, 52/591.4

[56] References Cited

U.S. PATENT DOCUMENTS

| | | |
|---|---|---|
| 1,913,342 | 6/1933 | Schaffert ................................ 52/588.1 |
| 3,043,407 | 7/1962 | Marryatt . |
| 3,131,794 | 5/1964 | Bender ....................................... 189/86 |
| 3,186,525 | 6/1965 | Gresham et al. . |
| 3,247,637 | 4/1966 | Robertson . |
| 3,555,762 | 1/1971 | Costanzo . |
| 3,708,943 | 1/1973 | Thomas et al. ............................. 52/588 |

*Primary Examiner*—Christopher T. Kent
*Assistant Examiner*—Nkeisha J. Maddox
*Attorney, Agent, or Firm*—Nixon & Vanderhye P.C.

[57] ABSTRACT

A wall module has a first connecting portion with a non-symmetrical tongue with a tip at one end, an abutment near the opposite end, and a convex arcuate surface between them. The module also has a second connecting portion with a groove having a shape complementary to the tongue, including a blind first end, open second end with an abutment adjacent to it, and an arcuate surface between the ends. An intermediate portion connects the first and second connecting portions, and may be flat or define an open rectangle. Two modules are connected together by inserting the tongue of one into the groove of the other and rotating (e.g. about 90°) until the abutments abut. The modules may be joined by bolts to other modules or an elevator cage.

20 Claims, 2 Drawing Sheets

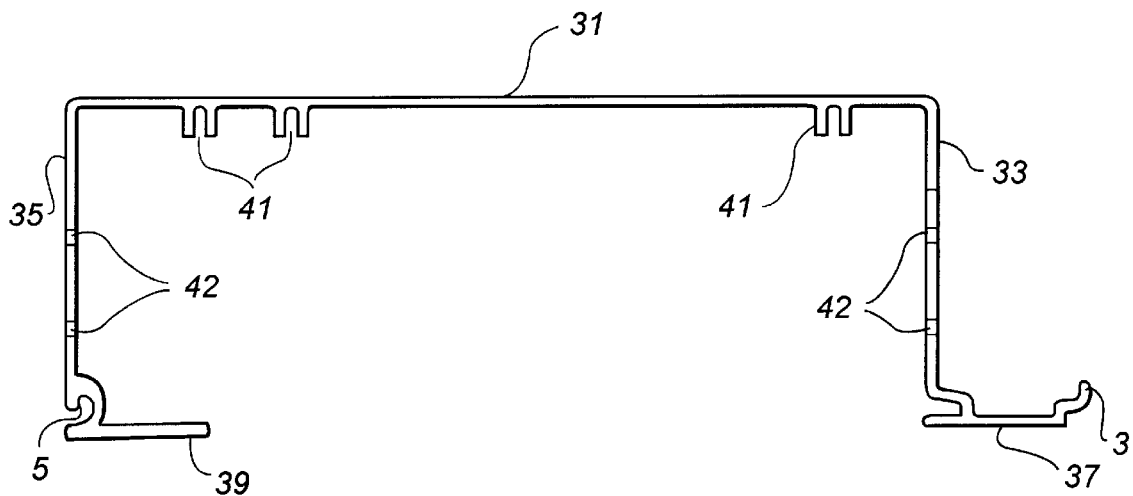
FIG. 2
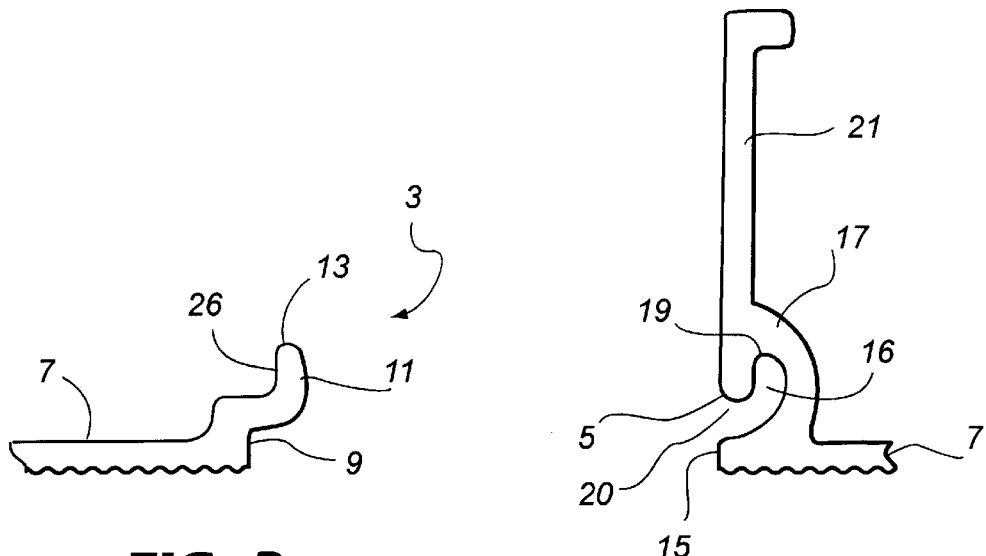
FIG. 3
FIG. 4

6,038,828

WALL MODULE SYSTEM

BACKGROUND AND SUMMARY OF THE INVENTION

The invention relates to a wall module and a method for mounting such wall modules. Specifically, the invention relates to a wall module in accordance with the preamble of claim 1, having a first longitudinal connecting portion spaced from and parallel to a complementary second connecting portion, an intermediate portion connecting the two connecting portions to each other, the first and the second connecting portions being connecteable to a second and a first connecting portion, respectively, of other wall modules for forming a wall assembly comprised by a plurality of joined wall modules, each wall module having a constant cross section. The invention also relates to a method for mounting such wall modules. In particular the wall module and the method of the invention are intended to be used in lifts.

In the past, bent and painted steel profiles were used, which were joined, e.g. for forming a wall in a lift (elevator) cage. Thereby the manufacture of the steel profiles required many working moments, such as bending of edges and possibly also of the intermediate portion for dishing the same for providing rigidity and stability of the steel profile, boring for bolts, which are used when joining the steel profiles, and finally surface treatment, generally painting.

When joining the steel profiles, these are placed side by side, bolts then being inserted into bores made for this purpose in the profiles, whereupon nuts are threaded on the bolts for forming uniting bolt joints.

As known, the mounting of bolt joints is rather time-consuming and since the assembly of the profiles requires quite a number of such joints to be mounted in a satisfying manner, it should be realised that this work is a costly step in the manufacture of the lift cage. In spite of this, the joints do not function well. The junctions will often be untight and this in combination with the sheet material will result in a rather high noise level. When a joint filler is used in an attempt to improve the sealing and the noise absorption capacity, it will be found very difficult to apply and keep the filler in place, since this tends to fall out, generating gaps in the junctions.

A further important disadvantage in the use of bent and painted steel profiles is that they require a considerable maintenance, in particular in connection with lifts to be used in an outdoor environment, since the slightest scratch in the protecting paint layer immediately results in the start of a corrosive attack, which had to be stopped, e.g. by blasting/grinding and re-paint.

In view of this, the object of the invention is to provide a wall module and a method by means of which the aforementioned disadvantages are avoided, i.e. in other terms to provide a wall module and a method of assembly, which require significantly less numerous bolt joints than before, thereby allowing much quicker mounting than before, neither require bending nor painting steps, and which have improved noise performances and allow a joint filler to be applied and retained without falling out during mounting.

This object is solved by the features of the wall module and the method, respectively, of the invention, defined in the characterizing parts of claims 1 and 12, respectively.

Preferably, as defined in one of the subclaims, the wall module is an extruded aluminum profile, which provides for a simplified manufacture and a consummate rust protection.

BRIEF DESCRIPTION OF THE DRAWINGS

The invention will now be described more in detail by means of a preferred embodiment with reference to the annexed drawings, wherein:

FIG. 2 is a cross-section of another type of wall module in accordance with the invention, which may be used as a board for different equipment, FIG. 3 is a cross-section in a larger scale of a first connecting portion in the wall module of the invention, FIG. 4 is a cross-section in a larger scale of a second connecting portion in the wall modules of the invention, which is complementary to the first connecting portion.

DETAILED DESCRIPTION OF THE DRAWINGS

Figure 1:
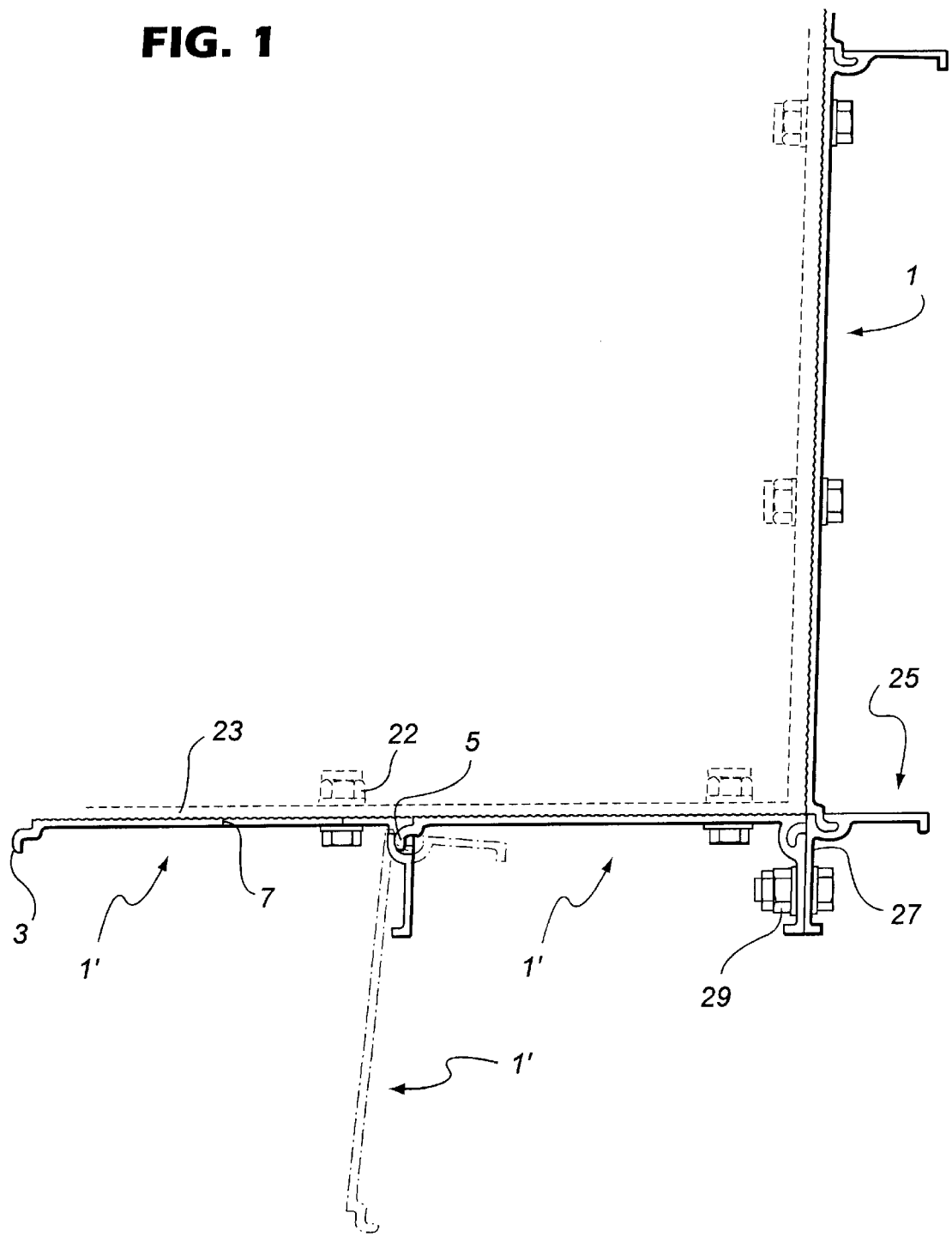
FIG. 1 is a cross-section of a mounted lift cage portion, using one type of wall modules in accordance with the invention.

Turning first to FIG. 1, which shows a corner of a lift cage wall, built up from joined wall modules 1, 1' of different widths. Each wall module 1, 1' is elongated and has a constant cross-section.

In one of the longitudinal sides of the wall module 1, 1' there is a first connecting portion 3, formed like a non-symmetrical tongue, and in the other longitudinal side of the wall module 1, 1' there is a second longitudinal connecting portion 5, formed in a cross-section like a groove (preferably also non-symmetrical).

Between these complementary connecting portions 3, 5 an essentially flat wall portion 7 extends, the flat portions of the wall portions being flush with each other, when mounted.

For a more detailed description of the connecting portions reference is now made to the views in a larger scale of FIGS. 3 and 4. A longitudinal side of the flat wall portion 7 of the wall module 1' ends in a transversely extending abutment 9. In the vicinity thereof an arcuate tongue surface 11 originates from the back of the wall portion 7, which in this case has the form of a quarter of a ring with a rounded tip. Thus, the tip 13 of the tongue 3 is directed perpendicularly away from the flat wall portion 7. The other longitudinal side of the wall module 1' ends in an abutment 15, transverse to the flat wall portion 7, as well. The two abutments 9, 15 are designed for cooperation with each other in order to form the least possible clearance between two joined wall modules 1, 1' and simultaneously to provide a rotational limitation.

Of course, it should be understood, that the abutments 9, 15 must not be normal to the flat wall portion 7, but may be comprised by inclined complementary chamfers.

The second connecting portion 5 is complementary to the first one 3 in an extension 17 on the back of the wall portion 7, in the form of an arcuate groove 16, which in a cross-section has the form of a quarter of a ring (i.e. the groove 16 extends about 90°). The width of the groove 16 is of course somewhat larger than that of the tongue 3 so that the latter may be inserted into the groove 16. The blind end 19 of the groove 16 is, in the same manner as the tongue 3, directed perpendicularly to the wall portion 7. The extension 17 thereafter continues in an angled reinforcing rib 21 in order to give the wall module 1, 1' sufficient rigidity. This rib 21 may also serve as a coupling member at corner sections and the like.

In the preferred embodiment of FIGS. 3 and 4, the non-symmetrical tongue 3 (FIG. 3) has a convex arcuate surface 11 between the tip 13 at a free end thereof and the abutment 9 adjacent the second end thereof. Opposite convex surface 11 is a substantially flat surface 26 (FIG. 3), substantially parallel to abutment 9. The groove 16 (FIG. 4) has complementary surfaces to 11, 26, extending between the blind end 19 and the open end 20 of the groove 16. An imaginary plane bisecting the blind end 19 makes an angle (about 90° in the embodiment illustrated) with an imaginary plane bisecting the open end 20 (this last plane is also preferably substantially perpendicular to the abutment 15).

In order to show the mounting of the modules 1, 1', again reference is made to FIG. 1, in which below an unassembled wall module 1' is illustrated with dashed lines in its starting position. The unassembled module 1' is placed with its flat wall portion 7 generally transversely to the wall portion 7 of an assembled module, with the open end 20 of the groove 16 situated on the protruding tip 13 of the tongue 3. The module 1' will then be rotated (upwardly in FIG. 1) about the tongue 11, whereby it will penetrate deeper into the groove 16. The rotation will be stopped when the abutments 9, 15 engage each other or when the tip 13 of the tongue 11 reaches the bottom 19 of the groove 16. The module 1' assembled at this moment may then be fixed by means of a suitable connection, in this case a bolt joint 22, which is threadened into the module 1' and into e.g. the downwardly bent roof portion of the lift (elevator) cage (shown with a dashed line at 23 in FIG. 1).

Preferably, a joint filler is applied into the groove 16 before the joining of an adjacent module for providing tightness and noise reduction. By this measure the modules may also be given a certain degree of prestress.

In FIG. 1 it also can be seen how a corner may be mounted. The corner member 25 is an angled profile having a second connecting portion provided with a groove, which is formed in the same manner as the connecting portion 5 of the described module 1'. This connecting portion 5 is assembled in the same way as the other connecting portions 5, i.e. on a tongue 3. The other leg 27 of the angled profile has the same form as the rib 21 and is joined to the reinforcing and connecting rib 21 of the next wall module 1' by means of bolt joints 29.

It should be realised that the portion between the connecting portions 3 and 5 of a wall module need not nessecarily be flat. If a stepwise transition is desired, e.g. the connecting portions 3, 5 may be displaced in parallel in relation to each other and connected to each other by a steplike portion. The intermediate connecting portion may also be angle in correspondence to a desired corner angle of a corner of the space to be covered.

An additional wall module variant is illustrated in FIG. 2. In this case the intermediate portion 31, which connects the connecting portions 3, 5, has a section in the form of an open rectangle having a long side and two short sides 33 and 35. Only two thin and flat wall sections 37 and 39, respectively, connect to the connecting portions 3, 5, whch may be prolongations of the thicker adjacent wall portions 7. The illustrated structure is designed to comprise electric equipment and includes attachment means 41 for this equipment. A similar structure for other equipment, e.g. fans and ventilation, is also possible.

The structure, shown in FIG. 2, may in addition be used as an emergency ladder, i.e. if ladder pins are mounted in openings 42 appropriate distances from each other between the walls 33 and 35, it may be utilized as a retracted emergency ladder in case of evacuation of the lift cage in an emergency situation. The structure may be used as as a ladder in a shaft, as well.

It has not previously been mentioned, but all illustrated members are designed so that they may be extruded of aluminum without any problems. Thereby a lower weight in relation to steel sheet and an approximatively complete freedom of maintenance as regards corrosion is obtained, in addition to an improved noise level. Of course, the members of aluminum may undergo a conventional surface treatment, e.g. anodizing.

In spite of the slightly higher cost of material for aluminum, a significant cost reduction is achieved in comparison to steel sheet, as a result of the simplified and faster mounting. In fact, the profiles only have to be inserted into each other, be folded down and be anchored by a small number of bolt joints in relation to the many more connections used, when mounting profiles of steel sheet.

What is claimed is:

1. A wall module joinable with other similar modules to form a wall, comprising:

a first connecting portion;

a second connecting portion spaced from said first portion;

an intermediate portion connecting said first and second portions together;

said first connecting portion comprising an outwardly extending non-symmetrical tongue having a tip at a first end thereof and an abutment adjacent a second end thereof, and a convex arcuate surface extending between said first and second ends;

said second connecting portion comprising an extension having a groove formed therein, said groove having a shape complementary to said tongue including a blind first end cooperable with said tip of a cooperating module, an abutment surface formed by said extension adjacent an open second end of said groove opposite said first end and cooperable with said tongue abutment of a cooperating module, and an arcuate portion between said first and second ends of said groove and cooperable with said convex arcuate portion of a cooperating module, an imaginary plane bisecting said blind end making an angle with respect to an imaginary plane bisecting said open end; and said first and second connecting portions being dimensioned and constructed so that said tongue of said module may be inserted into a said groove of a cooperating module and rotated with respect thereto so that said tongue tip engages the cooperating module groove blind end, and said convex arcuate potion engages the cooperating module grooves arcuate portion, and said tongue abutment abuts the cooperating module extension abutment surface, so that said module is releasably locked in place with the cooperating module.

2. A wall module as recited in claim 1 wherein said intermediate portion is substantially flat and of substantially constant cross-section.

3. A wall module as recited in claim 1 wherein said groove has an arcuate extend between said first and second ends thereof of about 90°, and said angle between said imaginary planes bisecting said first and second ends of said groove comprising about 90°.

4. A wall module as recited in claim 1 wherein said intermediate portion comprises a first portion substantially comprising an extension of said tongue abutment, a second portion substantially transverse to said first portion, a third portion substantially transverse to said second portion and extending away from said tongue, and a fourth portion substantially transverse to said third portion and substantially parallel to and coextensive with said second portion, said first through fourth portions not cooperating with said tongue or groove to connect said module to a cooperating module.

5. A wall module as recited in claim 4 wherein said second, third and fourth portions of said intermediate portion define a substantially open and rectangular chamber.

6. A wall module as recited in claim 5 further comprising a board for electric equipment, a control, or ventilation equipment, mounted in said chamber.

7. A wall module as recited in claim 5 wherein said module further comprises ladder pin-receiving openings provided in said second and fourth portions so that a ladder may be mounted in said chamber connected to said wall module by ladder pins.

8. A wall module as recited in claim 1 wherein said wall module comprises an aluminum extrusion.

9. A wall module as recited in claim 1 further comprising a joint filler in said groove.

10. A wall module as recited in claim 1 wherein an imaginary planar extension of said tip is substantially parallel to said tongue abutment, and said tongue has a substantially flat surface opposite said convex arcuate surface and said groove has a surface complementary to said tongue substantially flat surface, said substantially flat surface being substantially parallel to said tongue abutment.

11. A wall module as recited in claim 1 wherein said tongue and extension abutments are substantially parallel to each other.

12. A wall module as recited in claim 1 wherein said extension is integral with a connecting rib extending away from said extension generally parallel to said extension abutment.

13. A wall module as recited in claim 1 wherein said wall module comprises a first wall module, in combination with a second, cooperating wall module, said tongue of said first module disposed in said groove of said second module and said tongue and extension abutments of said first and second modules, respectively, abutting each other.

14. A combination as recited in claim 13 wherein said first and second modules are connected to a plurality of other modules including by a bolt joint.

15. A combination as recited in claim 13 wherein the sole connection between said first and second modules consists of said tongue, groove, and abutments.

16. A method of jointing a first wall module as recited in claim 1 to a second wall module as recited therein, comprising:
  (a) inserting the tongue of the first module into the open second end of the groove of the second module;
  (b) continuing insertion of the tongue of the first module into the groove of the second module until the convex arcuate surface of the tongue engages the arcuate surface of the groove; and then
  (c) rotating the first and second modules with respect to each other in a first direction, with the arcuate tongue and groove surfaces thereof engaging, until the tongue and extension abutment abut each other or the tongue tip engages the blind first end of the groove, precluding further relative rotational movement of the first and second modules with respect to each other in the first direction.

17. A method as recited in claim 16 wherein (c) is practiced for an arcuate extent of about 90°.

18. A method as recited in claim 16 further comprising connecting the first and second modules to other modules, including by using joining bolts which join modules to each other.

19. A method as recited in claim 18 further comprising joining the wall modules to an elevator cage with bolts.

20. A method as recited in claim 16 further comprising joining the wall modules to an elevator cage with bolts; and putting a joint filler in the groove prior to (c).

* * * * *